Patented June 22, 1954

2,681,858

UNITED STATES PATENT OFFICE 2,681,858

CONVERSION OF LACTOSE TO GLUCOSE AND GALACTOSE

Edwin G. Stimpson, Sayville, N. Y., assignor to National Dairy Research Laboratories, Inc., Islip, N. Y., a corporation of Delaware No Drawing. Application November 30, 1950, Serial No. 198,506

42 Claims. (Cl. 99—55)

This invention relates to the enzyme hydrolysis of lactose to glucose and galactose and, more particularly, to a process of treating milk products with lactase to convert the major proportion of the lactose therein to glucose and galactose without changing the total sugar content thereof or the proportion of sugar to the other milk solids. The invention also relates to milk products in which a major proportion of the lactose has been converted to glucose and galactose.

The utilization of milk products in concentrated form has been limited heretofore by the low solubility of lactose in water. For example, skim milk cannot be stored if it is concentrated beyond a total solids content of 30%, for at higher concentrations large lactose crystals quickly are deposited. Similarly, there is an upper limit of solids concentration for both whole milk and whey beyond which lactose crystallization becomes a problem. Also, in the manufacture of ice cream the amount of milk solids-not-fat must be within the range from 10 to 10.5%, for at higher proportions lactose will crystallize on storage and produce a so-called "sandy" ice cream.

Crystallization of lactose is a serious problem, because it upsets the uniformity of the product and makes the product difficult to handle and use. The problem is further complicated by the difficulty experienced in redissolving lactose once it has crystallized.

Various methods have been proposed to prevent or overcome lactose crystallization. According to Patent No. 2,360,033 to Baumann, dated March 3, 1941, if milk is heated at 220° to 260° F. under pressure, lactose will be hydrolyzed to a combination of simple sugars. But at these temperatures milk coagulates and thus the process is of limited utilization. Patent No. 2,433,850 to Leviton, dated June 22, 1943, suggests that riboflavin will retard crystallization of lactose in ice cream, but riboflavin is an expensive material. Patents Nos. 2,233,178 and 2,307,234 to Otting and Quilligan, dated respectively January 6, 1939 and July 20, 1940, suggest the treatment of milk with an ion exchange material, but such a method changes the proportions of milk solids to each other and alters the chemical nature of the salts present in milk. Other methods of hydrolyzing lactose have been suggested. Patent No. 783,015 to Britt, dated April 22, 1904, employs electrolysis and Patents Nos. 1,414,214 and 2,117,681 to Sanna et al., dated respectively January 19, 1921 and August 11, 1936, suggest the use of heat with an acid. None of these methods, however, has come into general use.

According to Patent No. 1,737,101 to G. D. Turnbow, dated November 26, 1929, the lactose present in milk can be hydrolyzed to simple sugars more soluble in water than lactose through use of lactase enzyme. In the process of this patent the lactase enzyme preparation is added to unpasteurized unconcentrated skim milk, which is then incubated at 158° F. or like elevated temperature until the desired amount of hydrolysis has taken place. This patent asserts that it is possible in this way to hydrolyze as much as 30% of the lactose, and this yield has been confirmed by independent experimentation. However, a 30% yield is too low to be practical in a commercial process. Also, for some uses if lactose crystallization is to be prevented it is essential that a major proportion of the lactose in the milk product be hydrolyzed to glucose and galactose. Moreover, available lactase enzyme preparations frequently impart an undesirable flavor to the milk treated therewith and this has limited the use of the lactase-hydrolyzed product to non-human foods.

Accordingly, it is an object of the present invention to provide a method of hydrolyzing the lactose contained in milk products to glucose and galactose without appreciably altering the flavor of the milk product.

It is a further object of the invention to provide a method of improving the solubility of milk products in water so that they may be prepared in a concentrated form without danger of lactose crystallization.

It is also an object of the invention to provide a concentrated milk product wherein the major part of the lactose has been converted to glucose and galactose without appreciably changing the total sugar content of the milk product or the proportions of sugar to other milk solids components.

It is a further object of the invention to provide a process of improving the yield of glucose and galactose obtainable by hydrolysis of lactose through the action of a lactase enzyme preparation.

It is also an object of the invention to provide an improved method of preparing lactase enzyme, which, when employed in a novel process of hydrolyzing the lactose present in milk, is capable of producing a nearly or substantially lactose-free milk product of good flavor.

It is another object of the invention to provide a process of preparing a milk product which does not age-thicken during frozen storage.

These objects are accomplished in accordance with the invention by adding a lactase enzyme preparation to a concentrated milk product having at least a 20% solids content and holding the mixture under conditions favoring lactase hydrolysis of lactose to glucose and galactose.

A further feature of the process of the invention consists in pasteurizing the raw milk product prior to the addition of the lactase enzyme. After hydrolysis has been permitted to proceed to the desired extent, the hydrolysis may be arrested by suitable heat treatment and the resulting product may be further concentrated, frozen or dried, according to the desired end use.

The invention is particularly applicable to cows' milk. However, the terms "milk" as commonly used refers to the normal secretion of the mammary glands of a mammal, and all milks contain an appreciable lactose content. The process of the invention may be employed to reduce the lactose content without reducing the total sugar content of any milk including, in addition to cows' milk, mares' milk, goats' milk, ewes' milk, etc.

The term "milk product" is used generically in the specification and claims to refer not only to whole milk and skimmed milk, but also to the lactose-containing products derived from any of the above milks, including whey derived from casein or cheese manufacture, the mother liquor wash water obtained as a waste product in the production of lactose from whey or milk products, and lactalbumin mother liquors such as those obtained following the precipitation of lactalbumin. All milk products which contain lactose can be treated by the process of the invention, to reduce the lactose content thereof.

The milk product whose lactose content is to be hydrolyzed should have a solids content of at least 20% and preferably from 30% to 50% by weight. At lower solids concentrations the hydrolysis may stop far short of completion or excessive amounts of enzyme may be needed. At a solids concentration of 30%, for example, the extent of hydrolysis, using comparable amounts of enzyme, is twice that of the unconcentrated milk product. If the milk product initially has too low a solids content, it may be concentrated by any well known method which does not change the character or flavor of the milk, such as concentration in vacuo at a temperature in the range from 90° F. to 135° F.

It has been found that a further improvement in the extent of hydrolysis may be obtained if the milk product is pasteurized prior to inoculation with the lactase enzyme. Flash pasteurization will give a noticeably improved yield of glucose and galactose. In flash pasteurization processes, the milk is usually heated to a temperature of from 160° to 185° F. for from 10 to 30 seconds. However, the greatest improvement is obtained if the milk product is subjected to flash pasteurization at 180° F. to 185° F. for 10 to 30 seconds, or to pasteurization by a holding process, i. e., subjectd to a temperature of from 140° to 160° F. for 30 minutes or longer. It is thought that this phenomenon can be explained on the assumption that unpasteurized milk products contain some material which represses enzyme activity. Flash pasteurization at normal temperatures evidently is partially effective in destroying or inactivating this material, while pasteurization by a holding method is considerably more effective.

The milk may be pasteurized in lieu of concentration, with results more favorable than for unpasteurized, unconcentrated milk. For best results, however, the milk is both pasteurized and concentrated and this procedure is preferred. The pasteurization of the milk product may be accomplished either before or after concentration.

After pasteurization and/or concentration the milk product is treated with a lactase enzyme preparation and then held under conditions favoring lactase hydrolysis of lactose. Temperatures over a wide range, from 25° to 135° F., may be employed. At temperatures below 25° F. lactase activity is so slow as to be almost negligible. Even at 25° F. from 7 to 10 days may be necessary for hydrolysis to reach its fullest extent. Holding at temperatures above 135° F. will inactivate the enzyme. Hydrolysis reaches its fullest extent in from 4 to 5 hours at temperatures from 120° to 130° F., and the bacterial content of the milk decreases, and therefore temperatures within this range are preferred.

The amount of enzyme added to the milk product will depend upon the potency of the lactase preparation and the amount of lactose in the milk product, as well as the proportion of lactose that must be hydrolyzed. Thus, the amount of enzyme used may be widely varied, but in general from 1.5% to 3% of enzyme by weight of the quantity of lactose present in the milk product is employed, to achieve substantially complete, i. e., over 85%, hydrolysis of the lactose.

The hydrolysis may be halted at any time, as after the hydrolysis has proceeded to the desired extent, by treating the mixture to inactivate the lactase enzyme. Pasteurization by a holding method, as for example heating the mixture at 160° F. for 30 minutes, is effective for this purpose, but drying the mixture at a sufficiently elevated temperature, say above about 145° F., will also inactivate the enzyme. If the mixture is frozen and stored at 0° F. or below, enzyme activity is arrested but will resume when the mixture is reheated to room temperature or above.

Dependent upon its end use, the hydrolyzed product may be further concentrated, if desired, for storage or shipping purposes, or it may be frozen or dried by any convenient method, such as in a tray or spray drier.

Milk products prepared in accordance with the above procedure may contain as little as 10% of the lactose originally present, the remainder of the sugar content thereof consisting of glucose and galactose. However, products containing any desired larger proportions of lactose to glucose and galactose may be prepared by adjusting the amount of enzyme added or controlling the incubation conditions, or by arresting the hydrolysis at the desired stage.

Any lactase enzyme preparation known to the art may be employed in the process of the invention. It is essential, however, if the lactase is derived from bacteria, yeasts or molds, that the lactase be uncontaminated with those enzyme systems which convert glucose and galactose to carbon dioxide and alcohol. This type of enzyme system is termed "zymase" by the art and it will be understood that lactase preparations derived from yeast and employed in the process of the invention must be zymase-inactive in order to prevent conversion of glucose and galactose arising from hydrolysis to carbon dioxide and alcohol. If the zymase contained in the yeast is inactive, it is not necessary to separate the lactase from the yeast.

Among the yeasts which may be employed as the source of lactase enzyme are NRRL Y 665 *Saccharomyces fragilis*, NRRL YL 28 *Torulopsis spherica*, NRRL YL 36 *Zygosaccharomyces lactis* and strains of *Torula utilis* or *Candida pseudotropicalis* adapted to the utilization of lactose for growth and fermentation. A lactase enzyme obtained from suitable bacteria, such as *Lactobacillus bulgaricus*, or from a suitable mold such as *Aspergillus oryzae*, may also be used.

The zymase may be destroyed without destroying the lactase by drying the yeast under carefully controlled conditions, or by plasmolyzing the yeast with an organic solvent, such as toluene, chloroform or ethyl ether, or by heating the yeast at 123° F. in a medium whose pH is about 7.

A stable potent lactase enzyme preparation of bland flavor and good stability can be prepared as follows:

EXAMPLE 1

The solids content of whey derived from casein or cheese manufacture is adjusted to 2 to 8% by weight, and its pH is brought to within the range from 4.5 to 7.0, either by addition of lime or lactic acid or by inoculation with lactic acid-producing bacteria. The whey is then heated at 185° F. for 30 minutes in order to coagulate the protein, and the coagulated protein is separated by decantation or filtration.

The deproteinated whey is pasteurized by heating at 145° F. for 45 minutes or at 160° F. for 15 minutes or at 175° F. for 10 seconds, and its pH is taken to be sure it is within the range of 3.5 to 7.5. Preferably the pH of the whey is brought to 4.5. The whey is then inoculated with yeast of a lactase producing strain, such as *S. fragilis*, and allowed to ferment for from 10 to 30 hours at a temperature of approximately 86° F. During the fermentation it is desirable to aerate the medium with from 0.009 to 0.5 volume of air per volume of medium per minute.

The yeast cells are separated from the fermentation liquor and washed with warm water.

The yeast is then dried in any of several ways. Freeze drying in vacuo at 0 to 30° F. is particularly advantageous. The yeast may also be spray dried if it is dispersed in water to form a yeast cream of from 10 to 18% solids content. The yeast cream is fed into a spray drier whose inlet air stream is at a temperature of about 250° F. and whose outlet air stream is at approximately 170° F. The dry yeast powder is cooled to room temperature as quickly as possible after leaving the spray drier and is stored at 40° F. until use.

The yeast may also be dried in a tray drier provided the temperature does not exceed 150° F. The drying cycle should be completed in about 2.5 hours in an atmospheric tray drier or in about four hours in a vacuum tray drier.

The drying temperatures and times above given are applicable to any lactase-containing yeasts but they must be carefully controlled within the ranges given in order to keep the loss of lactase enzyme activity at a minimum and produce a dry enough product. During the drying operation the zymase is rendered inactive but lactase activity is substantially unaffected. Thus the dry product from either the tray or spray drier may be used as a lactase enzyme preparation in the process of the invention. Such a use of this preparation is illustrated in subsequent examples.

The lactase enzyme preparation obtainable by the above process has strong potency and good stability. It has a good light color and a bland flavor, and does not impart an undesirable flavor to milk products in which it is incorporated.

The following examples illustrate preferred embodiments of the process of the invention:

EXAMPLE 2

Raw whole milk, suitable for human use, is separated, and the resulting skim milk pasteurized at 160° F. for 30 minutes, then condensed in vacuo at a low temperature to a 30% solids content. The temperature of the condensed skim milk is adjusted to 123° F. Yeast lactase, prepared as set forth in Example 1, is dispersed in four times its weight of water to form a slurry, and this slurry is added to the skim milk in a ratio of one part by weight yeast lactase to each fifty parts by weight of lactose in the skim milk. During addition of the lactase slurry the skim milk is agitated vigorously. The mixture is then held at 123° F. for four hours, at the end of which time 80 to 90% of the lactose has been converted to glucose and galactose. In order to inactivate the lactase enzyme, the mixture is heated at 160° F. for 30 minutes. The product is cooled and may be frozen and stored at 0° F., or it may be dried by any convenient method, such as in a roll or spray drier.

The dried product may be used to prepare an ice cream or a process cheese.

EXAMPLE 3

Raw whole milk is flash pasteurized at a temperature of 180° F. for 15 seconds and then concentrated in vacuo to 20% solids. The temperature of the concentrated milk is then adjusted to 123° F. and a yeast lactase slurry added in the ratio of one part yeast lactase solids to each 50 parts of lactose solids in the milk. The mixture is incubated at 123° F. for five hours, after which time hydrolysis is approximately complete (80 to 90%).

The product is heated at 160° F. for 30 minutes in order to inactivate the lactase enzyme, and may then be spray dried to form a milk solids product suitable for addition to an ice cream mix.

EXAMPLE 4

Example 3 is repeated, concentrating the milk to a 50% solids content, instead of a 20% solids content. The pasteurization, hydrolysis, enzyme inactivation and spray drying operations are carried out as set forth in Example 3. The product is useful for addition to an ice cream mix or a process cheese.

EXAMPLE 5

Cheddar cheese whey (or other cheese whey or casein whey) is heated to 190° F. and held at that temperature for 30 minutes and then concentrated to a 30% solids content. The concentrate is adjusted to 123° F., neutralized to a pH of 6.6 by the addition of a 30% solution of caustic soda, and the yeast lactase slurry added in the ratio of one part yeast lactase solids to 40 parts lactose content in the whey. The mixture is then held at 123° F. for four hours, flash pasteurized at 185° F. for 15 seconds and condensed to a 65% total solids concentration. The total solids concentration may be increased up to 75% total solids, if desired. Beyond that point the viscosity is such as to make the product difficult to handle.

Some whey producing plants may supply whey with excessive amounts of heavy metal contamination which is inhibitory to enzyme action. The enzyme treatment of such wheys should be continued for ten to fourteen hours and in some cases sodium sulfide may be added to decrease the heavy metal content.

The resulting concentrate may be shipped in tank cars or stored in bulk without danger of setting up due to lactose crystallization or may be used directly in the preparation of animal feeds. When used as an animal feed it is superior to untreated whey in that much larger quantities may be incorporated in the diet because of the lower lactose content.

EXAMPLE 6

A 50 gallon batch of whey derived from casein manufacture, or cheddar cheese whey, acidified with lactic acid, and having a pH of about 4.5, is pasteurized by heating at 145° F. for 30 minutes and is then treated with 2½ gallons of a *Saccharomyces fragilis* yeast culture prepared from whey. Fermentation is continued at about 86° F. for 20 hours. Thereafter the fermentation liquor is brought to a pH of 6.5 to 7.2 with 30% sodium hydroxide solution, and heated to 123° F. It is held at this temperature for 3½ hours, and then 240 pounds of 30% solids condensed skim milk is added. The milk is likewise at a temperature of 123° F.

The mixture is held for 10 hours at 123° F., at the end of which time lactose hydrolysis has reached over 65% of completion. The enzyme is inactivated by heating the product at 145° F. for 30 minutes, after which the batch is dried on a roll drier.

This product can be used as an antibiotic medium, where the antibiotic-producing organism needs simple sugars for its growth, but cannot use lactose, and where the proteins and minerals of skim milk or whey are desirable for the nutrient medium.

The material is also useful as an animal feed, where larger amounts of milk proteins are desired in the diet, but could not be used heretofore because of the cathartic effect of lactose.

EXAMPLE 7

Wet yeast cake (*Saccharomyces fragilis*) of 20 to 28% total solids is mixed with cold water in the ratio of 8 parts to each 3 parts of water and 2 parts of toluene are added. The mixture is homogenized and is then added to a 30% solids concentrated pasteurized skim milk (pasteurized and concentrated as set forth in Example 2) in the ratio of one part yeast to each 50 parts of lactose in the milk. The mixture is incubated at 135° F. for 3½ hours, at the end of which time hydrolysis has proceeded to its fullest extent. The product is pasteurized by heating at 160° F. for 30 minutes and is then spray dried. The toluene is removed during the drying, and the dried product is useful in place of milk solids in formulating animal feeds.

EXAMPLE 8

Example 5 is repeated, using mother liquor wash water obtained as a waste product in the production of lactose. The product, after drying, is useful in place of milk solids in animal feeds.

EXAMPLE 9

In order to demonstrate the effect of the solids content and pasteurization of the milk product treated in accordance with the invention, raw skim milk was inoculated with yeast lactase, prepared as set forth in Example 1, before concentration, after concentration to 30% solids, and after pasteurization and concentration. Mixtures of the raw concentrated skim milk and pasteurized concentrated skim milk were also treated. In each case the lactase was allowed to act on the skim milk for 4 hours at 123° F., after which the lactase enzyme was inactivated by heating the mixture at 160° F. for 30 minutes. The following results were obtained:

Table I
EFFECT OF CONCENTRATION AND PASTEURIZATION OF RAW SKIM MILK ON ENZYME ACTIVITY

| Treatment | Lactose Hydrolyzed In 4 hrs. at 123° F. |
|---|---|
| | Percent |
| Unconcentrated Raw Skim Milk | 20 |
| A. Raw Skim Milk Concentrated to 30% Solids | 38 |
| B. Flash Pasteurized at 160° F. for 14 sec. and Concentrated to 30% Solids | 54 |
| C. Flash Pasteurized at 185° F. for 14 sec. and Concentrated to 30% Solids | 85 |
| D. Pasteurized at 160° F. for 30 min. and Concentrated to 30% Solids | 85 |
| E. ½ A + ½ D | 51 |
| F. 98% D + 2% A | 82 |
| G. 99% D + 1% A | 85 |

The data in this table show that when the skim milk is concentrated the extent of hydrolysis is nearly doubled. Pasteurization of the raw milk prior to concentration more than doubles the extent of hydrolysis again. Hydrolysis in the concentrated product made from pasteurized milk is 4 times as great as that in the unconcentrated unpasteurized product. Mixing a concentrate of unpasteurized skim milk with the pasteurized concentrated skim milk considerably reduces the extent of hydrolysis.

It is thus apparent that the minimum combinations of time and temperature normally used to effect pasteurization of raw milk are insufficient to promote optimum hydrolysis of the lactose.

In order to explain the above results, it is suggested that a lactase-inhibitory factor exists in raw unpasteurized milk and that this is responsible for a partial inactivation or destruction of the enzyme. This inhibitory factor is destroyed or inactivated by a heat treatment of the order of that indicated.

This theory is further supported by the data in the following table, which shows the relationship between pasteurization temperature and extent of hydrolysis:

Table II
EFFECT OF PASTEURIZATION TEMPERATURE ON RAW MILK IN RELATION TO LACTASE ENZYME ACTIVITY

| Temperature at which milk was pasteurized prior to enzyme treatment | Percentage of lactose converted to glucose and galactose after pasteurization of raw milk for times indicated. (Raw skim milk concentrated to 30% solids equals 40% conversion) | | | | | | |
|---|---|---|---|---|---|---|---|
| | 14 sec. | 5 min. | 10 min. | 20 min. | 30 min. | 45 min. | 60 min. |
| 123° F.[1] percent | | | | | 40 | | 44 | | 57 |
| 145° F. do | | | | | | 41 | 87 | |
| 160° F. do | 47 | 71 | 75 | 87 | 87 | | |
| 165° F. do | 55 | | | | | | |
| 170° F. do | 57 | | | | | | |
| 175° F. do | 71 | | | | | | |
| 180° F. do | 87 | | | | | | |
| 185° F. do | 87 | | | | | | |

[1] This temperature is below that normally used for pasteurization

NOTE.—87% is considered maximum conversion under conditions of test used.

EXAMPLE 10

Skim milk is condensed in vacuo at a low temperature to a 30% solids content, and is then pasteurized by heating to 160° F. and held at that temperature for 30 minutes, after which its temperature is adjusted to 123° F. Yeast lactase, prepared as set forth in Example 1, is dispersed in four times its weight of water to form a smooth slurry, and this slurry is added to the skim milk in a ratio of one part by weight yeast lactase to each fifty parts by weight of lactose in the skim milk. During addition of the lactase slurry the skim milk is agitated vigorously. The mixture is then held at 123° F. for four hours, at the end of which time 80 to 90% of the lactose has been converted to glucose and galactose. In order to inactivate the lactase enzyme, the mixture is heated at 160° F. for 30 minutes. The product is cooled and may be frozen and stored at 0° F., or it may be dried by any convenient method, such as in a roll or spray drier. The product is useful in process cheeses, animal feeds, or ice cream mixes.

As illustrated in the examples, the dry and concentrated liquid hydrolyzed milk products produced in accordance with the invention have a variety of uses and may in fact be employed wherever milk solids are ordinarily used. The dry product is characterized by a high solubility in water, even at low temperatures, compared to lactose-containing milk products; both the dry and the concentrated liquid products are reconstitutable with water or milk to form a milk product of good flavor, having any desired solids content. Rich milks of above-normal solids content may be prepared, for example.

If dry or concentrated skim milk solids hydrolyzed as set forth are incorporated with cream and sugar to give a ratio of 12% fat, 10% milk solids-not-fat and 15% sugar and the mixture is pasteurized, homogenized and condensed to 75% total solids, or more, an ice cream concentrate is obtained which can be reconstituted by dilution with approximately an equal volume of water to give an ice cream mix that can be frozen in an ice cream freezer or a home refrigerator without danger of lactose crystallization. This mix will keep at room temperature or at 40° F. without developing lactose crystals. Ice cream concentrates prepared from skim milk solids which contain unhydrolyzed lactose sugar, on the other hand, cannot be stored for any length of time without extensive lactose crystallization.

The dry product may also be used in process cheese manufacture or in the preparation of animal feeds. Animal feeds usually cannot contain a large amount of milk solids, because of the cathartic effect of lactose, but when the milk product prepared as set forth herein is used, a higher proportion of milk solids than are ordinarily employed can be used because the glucose and galactose therein have no bad effects.

In seasons when milk is plentiful it is customary to concentrate the excess quantities of skim milk and freeze it for later use in ice cream. However, the frozen concentrated product cannot be stored for too long a period because the product age-thickens. In contrast, concentrated skim milk products in which the lactose has been hydrolyzed in accordance with the present invention can be frozen and stored without danger of age-thickening. Similarly, concentrated whole milk products whose lactose has been hydrolyzed as herein set forth do not age-thicken.

Whey products whose lactose content has been hydrolyzed to glucose and galactose can be concentrated to a 50% solids content or more without danger of lactose crystallization. The concentrate is substantially fluid and can be transported in tank cars and trucks in bulk quantity.

Whole and skim milk concentrates which do not contain appreciable amounts of lactose can be concentrated to a solids content at which the ratio of sugar and water is optimum for the prevention of bacterial growth. Such concentrates do not require sterilization, which is necessary in producing evaporated whole milk. Less extensive preparations such as are commonly used in the preparation of sweetened condensed whole milk are sufficient, prior to canning or strong concentrates prepared in accordance with this invention.

The milk products produced in accordance with this invention have a bland flavor and are eminently suited for human consumption when lactase enzyme preparations prepared as set forth in Example 1 are employed in the lactose hydrolysis. However, for animal feeds, antibiotic nutrient media and like purposes, other lactase enzyme preparations may be employed, such as those whose preparation is set forth in Examples 6 and 7.

Various modifications and changes may be made in the conditions under which the process of the invention is carried out, as will be apparent to those skilled in the art, and it will be understood that the invention is not to be limited except as set forth in the following claims.

I claim:

1. A process of hydrolyzing lactose contained in a milk product to lactase hydrolytic sugars including glucose and galactose which comprises pasteurizing the milk product, concentrating the product to at least a 20% solids content, adding an enzyme preparation in which the enzyme consists essentially of lactase enzyme and holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

2. A process in accordance with claim 1 in which the milk product is skim milk.

3. A process in accordance with claim 1 in which the milk product is whole milk.

4. A process in accordance with claim 1 in which the milk product is whey.

5. A process in accordance with claim 1 which includes arresting the hydrolysis after it has proceeded to the desired extent by inactivating the enzyme.

6. A process in accordance with claim 1 which includes holding the enzyme containing product at a temperature in the range from 25° to 135° F.

7. A process in accordance with claim 1 which includes pasteurizing the milk product by a holding method.

8. A process in accordance with claim 1 which includes pasteurizing the milk product by a flash method.

9. A process in accordance with claim 1 which includes pasteurizing the hydrolyzed product by a holding method in order to inactivate the lactase enzyme.

10. A process in accordance with claim 1 which includes drying the hydrolyzed product.

11. A process in accordance with claim 1 which includes spray drying the hydrolyzed product.

12. A process in accordance with claim 1 which includes concentrating the hydrolyzed product to a solids concentration up to 75%.

13. A process in accordance with claim 1 which includes concentrating the milk product to a solids content in the range of from 20% to 50%.

14. In the process of preparing concentrated milk products of improved solubility in water by effecting hydrolysis of the lactose contained therein to lactase hydrolytic sugars including glucose and galactose, the improvement which comprises concentrating the milk product to at least a 20% solids content and then holding the product in the presence of an enzyme preparation in which the enzyme consists essentially of lactase enzyme under conditions favoring hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

15. A process in accordance with claim 14 which includes pasteurizing the milk product prior to effecting hydrolysis of the lactose.

16. A process of hydrolyzing the lactose contained in a milk product to lactase hydrolytic sugars including glucose and galactose which comprises concentrating the product to at least a 20% solids content, treating the product with a lactase-active zymase-inactive enzyme preparation derived from yeast and holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

17. A process in accordance with claim 16 which includes treating the product with a dry lactase-active zymase-inactive enzyme preparation derived from yeast.

18. A process in accordance with claim 16 which includes treating the product with a plasmolyzed lactase-active zymase-inactive enzyme preparation derived from yeast.

19. A process of hydrolyzing lactose contained in a milk product to lactase hydrolytic sugars including glucose and galactose which comprises concentrating the product to at least a 20% solids content, treating the product with a fermentation liquor derived from yeast and containing lactase enzyme and holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

20. A process of hydrolyzing lactose contained in a milk product to lactase hydrolytic sugars including glucose and galactose which comprises deproteinizing whey, treating the whey with yeast of a lactase-producing strain, holding the whey under yeast-propagating conditions, treating the whey to inactivate the zymase contained in the yeast, incorporating the yeast-containing whey in a concentrated milk product having at least a 20% solids content and holding the mixture under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

21. A process in accordance with claim 20 which includes adjusting the pH of the whey to within the range of 3.5 to 7.5 and pasteurizing the whey prior to treating it with yeast.

22. A process of hydrolyzing lactose contained in a milk product to lactase hydrolytic sugars including glucose and galactose which comprises propagating yeast of a lactase-producing strain in a nutrient medium comprising lactose as a chief source of carbohydrate, treating the yeast to inactivate its zymase content, incorporating the yeast in a concentrated milk product having at least a 20% solids content and holding the mixture under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

23. A process in accordance with claim 22 which includes plasmolyzing the yeast with an organic solvent to inactivate the zymase.

24. A process in accordance with claim 22 which includes drying the yeast to inactivate the zymase.

25. A process of hydrolyzing the lactose contained in a milk product to lactase hydrolytic sugars including glucose and galactose which comprises concentrating the product to at least a 20% solids content, mixing the product with a heat treated lactase-active zymase-inactive yeast containing fermentation liquor having a pH of 6.5 to 7.2 and holding the mixture under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

26. A process of hydrolyzing lactose contained in a milk product to lactase hydrolytic sugars including glucose and galactose which comprises pasteurizing the milk product, adding an enzyme preparation in which the enzyme consists essentially of lactase enzyme and holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

27. A process in accordance with claim 26 which includes concentrating the pasteurized milk product to at least a 20% solids content.

28. A process in accordance with claim 26 in which the enzyme containing product is held at a temperature in the range from 25° to 135° F.

29. A process of preparing a reconstitutable milk product, over 80% of whose lactose content has been converted to lactase hydrolytic sugars including glucose and galactose, which comprises pasteurizing the milk product, concentrating the milk product to at least a 20% solids content, treating the product with a lactase-active enzyme preparation, holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose, inactivating the lactase enzyme and drying the product.

30. A process in accordance with claim 29 in which the enzyme containing product is held at a temperature in the range from 25° to 135° F.

31. A process of hydrolyzing lactose contained in a milk product to lactase hydrolytic sugars including glucose and galactose which comprises concentrating the product to at least a 20% solids content, pasteurizing the product, adding lactase enzyme thereto and holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

32. A concentrated milk product containing lactase hydrolytic sugars including glucose and galactose in the proportions to the lactose and to the other milk solids-not-fat resulting from at least an 80% lactase hydrolysis of lactose in naturally occurring milk, the lactase hydrolysis products and the residual unhydrolyzed lactose together accounting for substantially 100% of the original unhydrolyzed lactose.

33. A pasteurized milk product, the major proportion of whose sugar content consists of lactase hydrolytic sugars including glucose and galactose derived from the lactase hydrolysis of lactose, the lactase hydrolytic sugars including glucose and galactose and the unhydrolyzed lactose together accounting for substantially 100% of the lactose in naturally occurring milk.

34. A pasteurized whey product, the major proportion of whose sugar content consists of lactase hydrolytic sugars including glucose and galactose derived from the lactase hydrolysis of lactose, the lactase hydrolytic sugars including glucose and galactose and the unhydrolyzed lactose together accounting for substantially 100% of the lactose in naturally occurring milk.

35. A concentrated milk product containing the hydrolysis products of lactose in the proportions to the lactose and to the other milk solids-not-fat resulting from at least a 50% lactase hydrolysis of lactose in naturally occurring milk, the lactase hydrolysis products and the residual unhydrolyzed lactose together accounting for substantially 100% of the original unhydrolyzed lactose.

36. A concentrated pasteurized milk product containing the hydrolysis products of lactose in the proportions to the lactose and to the other milk solids-not-fat similar to those resulting from at least a 50% lactase hydrolysis of lactose in naturally occurring milk, the lactase hydrolysis products and the residual unhydrolyzed lactose together accounting for substantially 100% of the original unhydrolyzed lactose.

37. A pasteurized milk product containing the hydrolysis products of lactose in the proportions to the lactose and to the other milk solids-not-fat resulting from at least a 50% lactase hydrolysis of lactose in naturally occurring milk, the lactase hydrolysis products and the residual unhydrolyzed lactose together accounting for substantially 100% of the original unhydrolyzed lactose.

38. A concentrated milk product the major proportion of whose sugar content consists of lactase hydrolytic sugars including glucose and galactose derived from the lactase hydrolysis of lactose, the lactase hydrolytic sugars including glucose and galactose and the unhydrolyzed lactose together accounting for substantially 100% of the lactose in naturally occurring milk.

39. A concentrated whey product the major proportion of whose sugar content consists of lactase hydrolytic sugars including glucose and galactose derived from the lactase hydrolysis of lactose, the lactase hydrolytic sugars including glucose and galactose and the unhydrolyzed lactose together accounting for substantially 100% of the lactose in naturally occurring milk.

40. A process of preparing a frozen lactase hydrolyzed milk product having improved resistance to storage deterioration comprising pasteurizing the milk product, adding thereto an enzyme preparation in which the enzyme consists essentially of lactase enzyme, holding the product under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose, and then freezing the product.

41. A frozen pasteurized milk product, the major proportion of whose sugar content consists of lactase hydrolytic sugars including glucose and galactose derived from the lactase hydrolysis of lactose, the lactase hydrolytic sugars including glucose and galactose and the unhydrolyzed lactose together accounting for substantially 100% of the lactose in naturally occurring milk.

42. A frozen pasteurized milk product containing the hydrolysis products of lactose in the proportions to the lactose and to the other milk solids-not-fat resulting from at least a 50% lactase hydrolysis of lactose in naturally occurring milk, the lactase hydrolysis products and the residual unhydrolyzed lactose together accounting for substantially 100% of the original unhydrolyzed lactose.

References Cited in the file of this patent

UNITED STATES PATENTS

| Number | Name | Date |
|--------|------|------|
| 46,585 | Percy | Feb. 28, 1865 |
| 1,710,133 | Winkler | Apr. 23, 1929 |
| 2,128,845 | Myers et al. | Aug. 30, 1938 |
| 2,183,141 | Kauffmann | Dec. 12, 1939 |
| 2,482,724 | Baker | Sept. 20, 1949 |

OTHER REFERENCES

"Myrback et al., Physiol Chem. 277, 171–80 (1943)." Cited in Chemical Abstracts 5744.